(12) United States Patent
Kempen et al.

(10) Patent No.: US 6,696,682 B1
(45) Date of Patent: Feb. 24, 2004

(54) OPTICAL SIGNAL ACTIVE TRACKING USING TUNABLE FBG

(75) Inventors: Lothar U. Kempen, Redondo Beach, CA (US); Edgar A. Mendoza, Redondo Beach, CA (US)

(73) Assignee: Optech Ventures, LLC, Torrance, CA (US)

( * ) Notice: Subject to any disclaimer, the term of this patent is extended or adjusted under 35 U.S.C. 154(b) by 178 days.

(21) Appl. No.: 09/804,913

(22) Filed: Mar. 13, 2001

(51) Int. Cl.$^7$ .............................. G02B 5/18; G02B 6/34; G02B 26/00; G02F 2/00
(52) U.S. Cl. .............................. 250/227.11; 250/227.14; 359/325; 359/326; 385/12; 385/37
(58) Field of Search ..................... 250/227.11, 227.14, 250/227.21; 385/12, 13, 37; 359/325, 326

(56) References Cited

U.S. PATENT DOCUMENTS

| 5,699,468 A | * | 12/1997 | Farries et al. ............... 385/140 |
| 5,706,375 A | * | 1/1998 | Mihailov et al. ............. 385/24 |
| 6,345,134 B1 | * | 2/2002 | Laming et al. ............... 385/37 |
| 6,411,748 B1 | * | 6/2002 | Foltzer ......................... 385/7 |

* cited by examiner

Primary Examiner—Gerard R. Strecker
(74) Attorney, Agent, or Firm—Lawrence S. Cohen

(57) ABSTRACT

A method and apparatus for processing an optical signal in an optical waveguide using a closed loop wavelength dependent active tuning system. A tunable fiber Bragg grating, optical processor and a controller provide feedback control of the central wavelength of the tunable fiber Bragg grating. Changes in wavelength of the processed signal are followed to keep the tunable fiber Bragg grating tuned to a peak wavelength for maximum sensitivity.

14 Claims, 3 Drawing Sheets

OPTICAL SIGNAL ACTIVE TRACKING USING TUNABLE FBG

FIELD OF THE INVENTION

The invention is in the field of optical waveguides, such as optical fibers, used to detect and track changes in wavelength of the light in the waveguide. It also relates to optical fibers which have a fiber Bragg grating.

BACKGROUND OF THE INVENTION

Systems are known in which a signal input into an optical waveguide such as an optical fiber will undergo changes of its wavelength. The changes can be characterized as slow changes and rapid changes in wavelength. There are many causes of these changes, depending upon the particular system.

An example of such a system is one which uses a fiber Bragg grating (FBG) as a strain or temperature measuring device. An FBG is useful because it converts changes of a physical parameter such as strain or temperature to wavelength changes. A detection system can be used to subsequently convert the wavelength changes to an electrical signal, which can be employed for further processing. In such systems, for example in the strain gauge case where the subject under test undergoes strain, the output of the FBG varies over time due to the strain effects exhibiting the slow wavelength changes noted above. On the example of a temperature detection system, temperature changes also will typically be reflected as slow type changes in the FBG spectral response. The subject under test may undergo rapid change such as from vibration which will result in the FBG output reflecting the vibration as rapid changes in wavelength.

In some cases both slow and rapid changes may occur. It is desirable to be able to track the changes and to measure the changes in wavelength.

Typically such systems generate a light signal in a band of wavelengths about a central wavelength. While the wavelength of the light signal is representative of some measured or sensed parameters or varying event, the range of wavelength shift, in particular of the central wavelength, may be of such magnitude that the sensitivity of the measuring apparatus is reduced or even lost.

Thus, a problem occurs when the central wavelength of the incoming signal, or the wavelength range of interest moves out of the range where the detection system features its highest sensitivity.

SUMMARY OF THE INVENTION

This invention relates to processing signals in an optical waveguide which have slow or rapid changes in wavelength or both, and to apparatus and method for tracking the slow changes. The invention further relates to use of an optical fiber having a tunable Fiber Bragg Grating (tFBG) to determine the changes in wavelength as part of a closed feedback loop.

In accordance with the principles of the invention, the tFBG transmits light in a band of wavelengths about center wavelength characteristics of the tFBG. The closed loop path operates to determine the instantaneous maximum intensity of the light signal output from the tFBG. A processor in the closed loop produces a voltage (Vsignal) which corresponds to the instantaneous maximum intensity and compares the voltage, in real time, to a preset voltage which corresponds to the maximum intensity when the center wavelength of the tFBG matches the center wavelength of the optical signal (Vset). The difference between Vsignal and Vset is applied to a mechanism for physically changing the tFBG to adjust Vsignal toward being equal to Vset.

In further accordance with the principles of this invention, an optical apparatus and method for measuring the intensity of light waves, representative of some measured parameter, includes a feedback loop operative to adjust the center wavelength of the band of wavelengths to which a Fiber Bragg Grating (FBG) responds.

The feedback loop includes a tFBG which is coupled to a processor operative to convert the light energy (intensity) of the input light signal into an electrical signal. The amplitude of the electrical signal corresponds to the instantaneous intensity of the light signal. The feedback loop thus is operative to determine the maximum instantaneous amplitude (intensity) and to maintain the center wavelength of the tFBG at a value which corresponds to the instantaneous maximum intensity of the incoming light signal.

The processor in the feedback loop determines the maximum intensity value, a priori, and by assigning a voltage value Vset, representing a test or calculated maximum sensitivity value for the characteristic central wavelength of the tFBG. The instantaneous intensity value (Vsignal) is compared to that assigned value (Vset) on a real time basis and the tunable Fiber Bragg Grating is adjusted to move its center wavelength to (ideally) equal that of the assigned value, Vset.

In further accordance with the principles of the invention, there is described an apparatus and a method for processing an optical signal in an optical waveguide using wavelength-dependent transmission characteristics. The signal is in an optical waveguide, such as an optical fiber, the change in wavelength of which is to be tracked, is passed into a tFBG. A closed loop feedback system using the tFBG maintains the central wavelength of the transmitted signal from the tFBG at a peak wavelength operating point to compensate for large changes of the processed signal.

The output of the tFBG is coupled to an optical processor to convert the light energy into an electrical signal proportional to the light intensity variations which are a function of the wavelength changes. That electrical signal is then compared to a second electrical signal which is set to a selected predetermined level which represents the central wavelength of the optical signal. The comparison determines the difference between the central wavelength of the signal exiting the tFBG converted to an electrical signal and the preset electrical signal. Then, the tFBG is physically adjusted to reduce that difference to a minimum. By tuning the tFBG so that the output signal of the tFBG and the preset signal are equal, or toward minimizing their difference, in a feedback loop, the tFBG tracks and maintains the change in wavelength of the incoming signal within a range of high sensitivity of the tFBG. In addition to actively tracking and adjusting the central wavelength, the change can be read for use.

The varying instantaneous output of the detector is designated as Vsignal and the selected preset electrical signal is designated Vset. The feedback loop seeks to establish Vsignal combined with Vset to equal zero, that is, the feedback loop is operative to eliminate the difference between Vsignal and Vset. A controller does this by changing its output signal according to the difference and then operating a tuning apparatus to tune the tFBG. That is, the tuning apparatus changes the central wavelength of the signal through the tFBG and therefore Vsignal in a direction towards being equal to Vset.

In a preferred embodiment of the invention the optical signal source which provides an input or incoming optical signal, also referred to as a subject optical signal, is a sensor such as a temperature or strain sensor. An optical fiber connected between a sensor and a tunable FBG provides a subject optical signal to the tunable FBG. The sensor or other source of the incoming optical signal may also be a FBG. The sensor may be a plurality of sensors in which case a wavelength division multiplexer may be employed to distinguish the signal from each of the sensors. The plurality of sensors may comprise a plurality of FGBs.

DETAILED DESCRIPTION

The invention embodied in apparatus and method is designed for real time adjustment of the center wavelength of a narrow band light signal to correspond to the instantaneous maximum intensity of that signal especially under conditions in which the center wavelength varies and the signal can have both low and high frequency components. The center wavelength varies unpredictably. A problem arises when the center wavelength variation exceeds the sensitive region of the intensity curve for the signal. In such case the output variation is lost or degraded or in a worst case the center wavelength may move completely outside the responsive region of the intensity curve.

The invention is most useful in the case of an input signal that has both low frequency and high frequency components. That is, for example, in the case of sensor signals where both low frequency and high frequency events are being detected. Also, a signal may have two types of low frequency components. These can be characterized as the input which is desired to be observed and noise, such as drift. The low frequency components can have very high amplitudes and are more likely to exceed the sensitive region than are the high frequency variations.

Therefore, the purpose of the invention is to cause the system to stay in the sensitive region. This is accomplished by moving the center wavelength of a bandstop filter to maintain the system in the sensitive region.

In a specific implementation, the invention resides in an apparatus and method in which the incoming signal through an optical fiber is passed through an adjustable bandstop filter such as a tunable FBG (tFBG). The tFBG output is converted to a voltage, Vsignal, defined as the tFBG output voltage. That output voltage represents the central wavelength $\lambda$ot, at any given time, of the TFBG and is directed through a lowpass filter. A preset voltage, Vset, is selected which has a value based on the known characteristics and expected variation of the incoming signal such that the preset voltage value represents a central wavelength at or near the center of the expected range of variation of signals coming into the system. The difference between the output signal of the lowpass filter, Vsignal, and the preset signal, Vset, is determined and input to a controller which drives the tFBG tuning system to adjust Vsignal toward minimizing the difference between Vsignal and Vset, that is, toward a zero difference.

Figure 1:
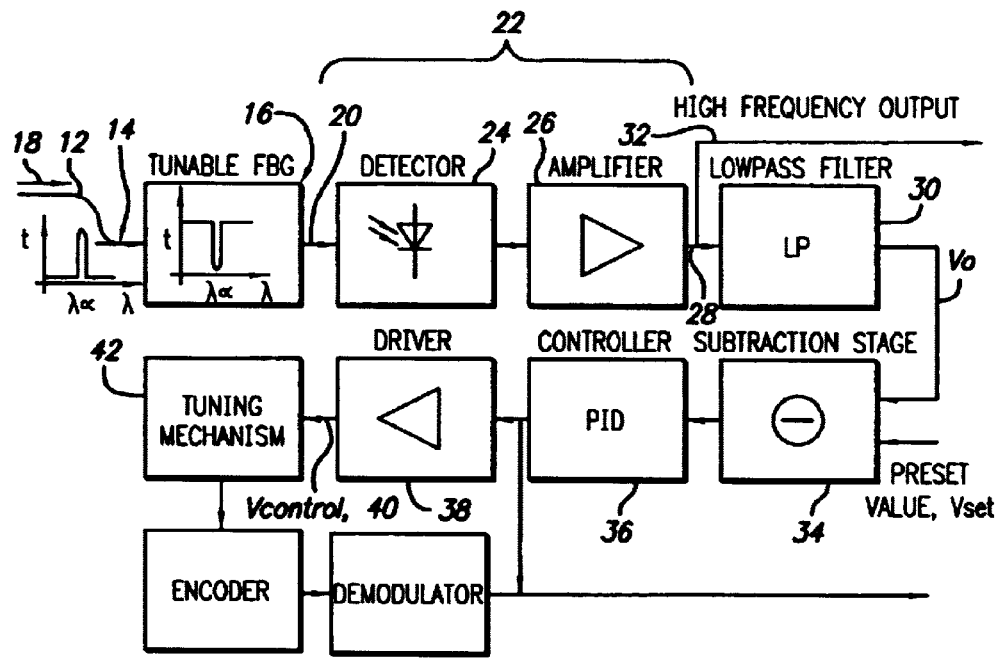
FIG. 1 is a schematic diagram of apparatus in accordance with the principles of the invention.

FIG. 1 shows a preferred embodiment of the invention. A guided wave optical signal transmission element such as an optical fiber 12 is connected to the input 14 of a tFBG 16. Fiber 12 carries an incoming optical signal 18 into the tFBG 16. The optical signal source which provides an input or incoming optical signal 18, also referred to as a subject optical signal, is a sensor such as a temperature or strain sensor. The optical fiber 12 connected between a sensor and a turnable FBG 16 provides a subject optical signal to the tunable FBG. The sensor or other source of the incoming optical signal 18 may also he a FBG. The sensor may he a plurality of sensors in which case a wavelength division multiplexer may be employed to distinguish the signal from each of the sensors. The plurality of sensors may comprise a plurality of FGBs.

The output of the lowpass filter 30 goes into a subtraction stage 34, in which Vsignal is compared to Vset to provide the difference V$\Delta$.

Figure 2:
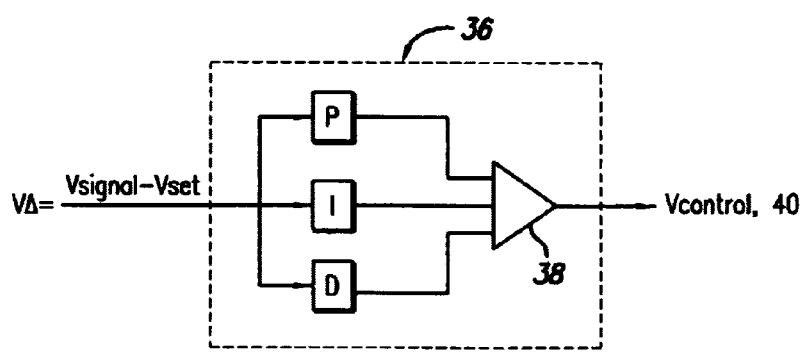
FIG. 2 is a schematic diagram of the PID processor shown in FIG. 1.

As also shown in more detail in FIG. 2, the PID controller 36 receives and processes the signal V$\Delta$ and sends it to the amplifier 38, the output defining Vcontrol, 40.

Vcontrol, 40 is a function of the output of the subtraction stage 34, and can be considered as defining the difference between the actual central wavelength of the incoming signal 18, at any given time and the desired central wavelength of the active region of the tFBG.

Figure 6:
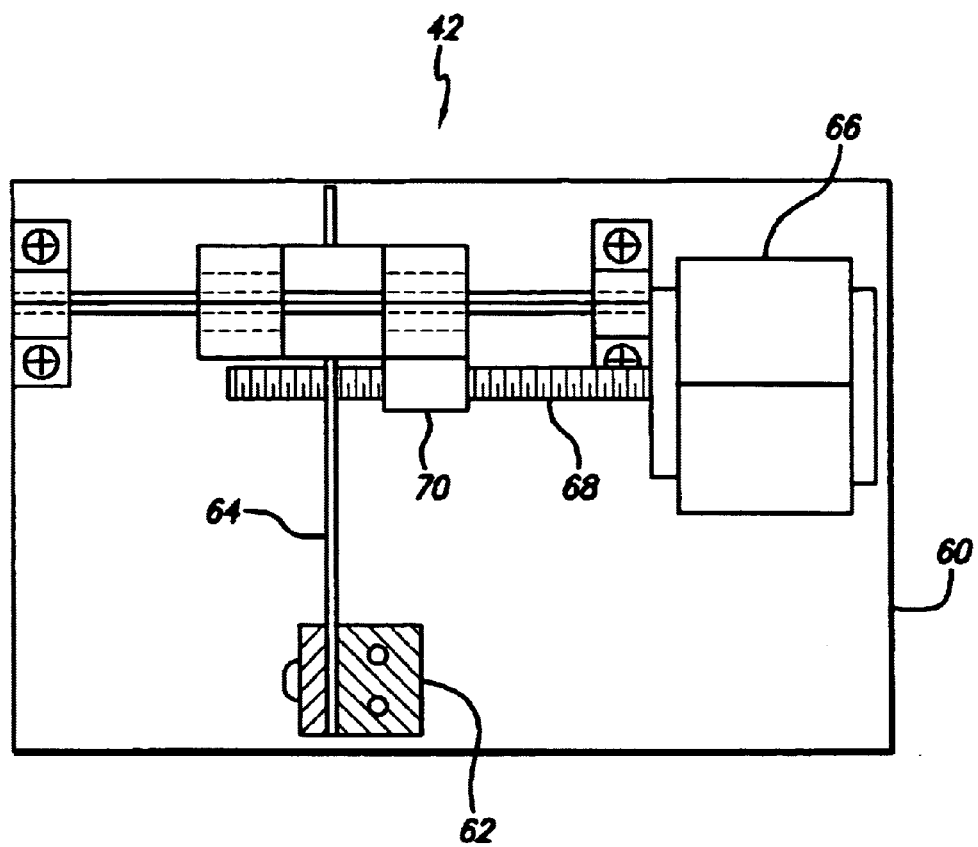
FIG. 6 shows a top view of a prototype of the mechanical tuning device.
Figure 7:
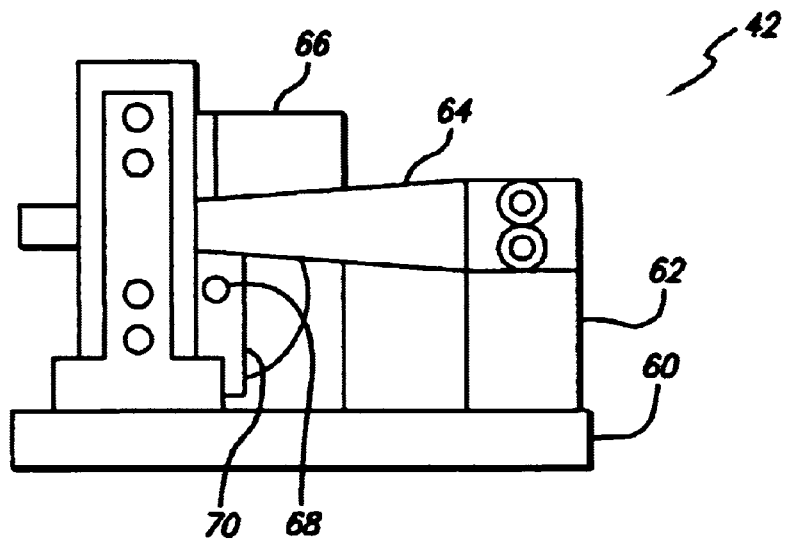
FIG. 7 shows an end view of the prototype of the mechanical tuning device.

The tuning mechanism 42 responds to Vcontrol, 40 to tune the tFBG so as to influence Vsignal, 28 to be at or near Vset, that is so that their difference equals or approaches zero. A prototype tuning mechanism is shown in FIGS. 6 and 7 and described below.

In operation, the closed loop system tunes the tFBG so that Vsignal and Vset approach equality, that is, so that their difference is zero. When Vset minus Vsignal is non-zero, a signal, Vcontrol, which represents the difference, is sent to the tunable tFBG tuning device to tune the tFBG 16 to adjust Vsignal to be equal to Vset. Therefore, in a given state, the tFBG output 20 has a central wavelength equal to that of the incoming signal 18. When the incoming signal 18 changes slowly, Vsignal changes and the closed feedback loop detects the change and compensates by tuning Vsignal to equal Vset. The tuning mechanism causes the tFBG to exhibit a wavelength shift by applying a physical effect on the tFBG to establish a new central wavelength of the tFBG, which, when converted to Vsignal becomes equal to Vset.

Also, when the difference between Vset and Vsignal is detected, it can be accessed to provide information on the dynamics of the wavelength change in the subject signal 18 as shown by the output of Vsignal at 32. The term "slow" change in wavelength means a rate of change that can be reacted to by the tuning mechanism used for tuning the tFBG.

The closed loop tracks the central wavelength of the tFBG output 20. With this system, the tFBG 16 can track the changes of the incoming signal 18. Therefore, in addition to using the change in Vsignal—Vset to bring the central wavelength of Vsignal into the sensitive region, that is the region of highest intensity that change, or series of changes over time can be used to analyze the events being sensed or measured and transmitted as changes in the signal 18.

The mechanical tuning system has such slow operation that the foregoing described system is good for tracking and measuring low frequency, that is slowly changing events, but is not available for events that cause changes in Vsignal faster than the tFBG 16 can be physically tuned. The low pass filter 32 filters out events that are too fast, thereby allowing only sufficiently slow events to operate in the closed loop.

Further, since Vcontrol is a function of the central wavelength of the tFBG 16, the central wavelength of the tFBG can be calculated, and also, the wavelength of the incoming signal 18 can be calculated. The wavelength of the incoming signal 18 is available by determining the tuning requirement to which the tFBG 16 is being tuned, that is Vcontrol, which can be described as a demodulation readout mechanism for detecting the wavelength of a narrow band signal.

Figure 3:
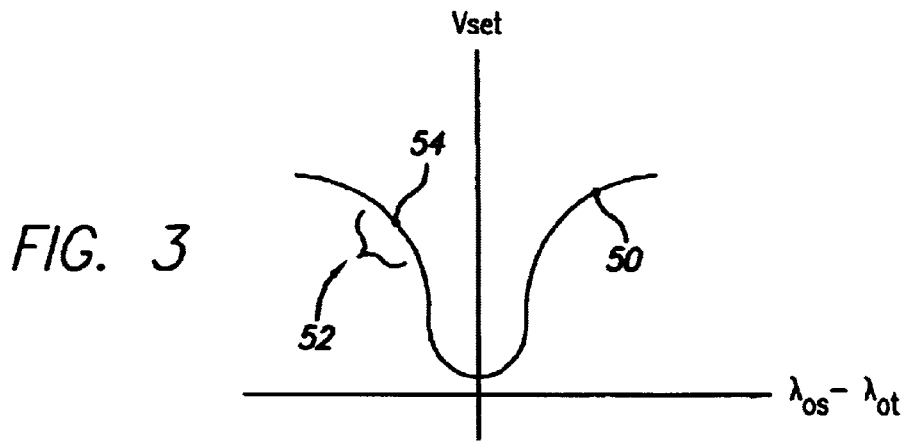
FIG. 3 is a graph illustrating the power wave of a received signal, and the sensitive region.

FIG. 3 shows a typical curve 50 of the power measured at the detector 24 with respect to the intensity difference in the central wavelength of the signal 18 ($\lambda$os) and of the tFBG ($\lambda$ot). One portion of the curve 52 is a region of high slope defining the sensitive region and the point 54 represents the central wavelength. With a prediction based on understanding of the expected behavior of the target objects, Vset is selected to be at or near point 54. The explanation below entitled Sensor Demodulation Using Matched Grating: Analytical Model is an analytical method of determining that central wavelength. Consequently, the changes in tFBG keep Vsignal in the higher sensitivity portion of this curve, and most preferably its central wavelength at the point of highest sensitivity 54. By operating at the area of higher sensitivity, it is possible to detect small differences in the wavelength of the incoming signal 18. Therefore, Vset is selected such that the region of maximum sensitivity is used.

FIGS. 6 and 7 show a top and an end view respectively of a prototype of the tuning mechanism 42. The prototype tuning mechanism 42 has a base 60 on which is mounted a rigid stanchion 62. Extending cantilevered from the rigid stanchion is a flexible arm 64. An electric motor 66 is also mounted on the base 60 and turns a jackscrew 68 on which is mounted a traversing nut 70. The flexible arm 64 is captured in the traversing nut 70 at its end away from where it is rigidly mounted on the rigid stanchion 62. The tFBG (not shown) is mounted on the flexible arm 64. In operation the tuning signal, Vcontrol 40 will operate the electric motor appropriately to turn the jackscrew 68, traversing the traversing nut 70 to cause the flexible arm 64 to change its state of flexure. This change will affect the state of the tFBG to change its output wavelength appropriately as described above.

Sensor Demodulation Using Matched Grating: Analytical Model

The following analysis is for general application and in particular for application where the incoming signal is from a Fiber Bragg grating.

One of the highest sensitivities in converting the wavelength shift in the sensor grating to a measurable intensity shift can be obtained by using a second Fiber Bragg Grating as the readout element. This novel technique, "wavelength tracking", will allow maintaining of this high sensitivity demodulation over a large dynamic range.

The spectral reflection $S_r$ from an FBG illuminated by a broadband source can most conveniently be modeled as a Gaussian spectrum with the amplitude of the spectral density $A_r$, the central wavelength $\lambda_{Or}$, and the spectral width, $\Delta\lambda_r$:

$$S_r = A_r \cdot e^{-\left(\frac{\lambda-\lambda_{0r}}{\Delta\lambda_2}\right)^2} \qquad (2\text{-}1)$$

The power of the reflected light can be calculated by spectrally integrating the function; the primitive is:

$$P_r = \left(\frac{-A_r}{2} \cdot \sqrt{\pi} \cdot \Delta\lambda_r \cdot erf\left(\frac{\lambda_{0r}-\lambda}{\Delta\lambda_r}\right)\right) \qquad (2\text{-}2)$$

This leads to a simple relation of the reflection amplitude $A_r$ and the power $P_r$:

$$A_r = \frac{P_r}{\Delta\lambda_r \cdot \sqrt{\pi}} \qquad (2\text{-}3)$$

The power spectrum $S_{tg}$ of the light transmitted through the readout grating is given by:

$$S_{tg} = S_r \cdot T_g \qquad (2\text{-}4)$$

With the transmission function $T_g$ given by:

$$T_g = 1 - t \cdot e^{-\left(\frac{\lambda-\lambda_{0t}}{\Delta\lambda_t}\right)^2} \qquad (2\text{-}5)$$

Where t denotes the transmission coefficient, $\lambda_{Ot}$ the central wavelength, and $\Delta\lambda_t$ the spectral width of the demodulation grating.

The power spectrum of the transmitted light is therefore given by:

$$S_{tg} = \frac{P_r}{\Delta\lambda_r \cdot \sqrt{\pi}} \cdot e^{-\left(\frac{\lambda-\lambda_{0r}}{\Delta\lambda_r}\right)^2}\left[1 - t \cdot e^{-\left(\frac{\lambda-\lambda_{0t}}{\Delta\lambda_t}\right)^2}\right] \qquad (2\text{-}6)$$

The power of the transmitted light again is obtained by integrating over the spectrum:

$$P_{tg} = P_r \cdot \left[1 - \frac{t \cdot \Delta\lambda_t \cdot \exp\left[\frac{-(\Delta\lambda_r^2 \cdot \lambda_{0t}^2 + \Delta\lambda_t^2 \cdot \lambda_{0r}^2)}{(\Delta\lambda_r^2 \cdot \Delta\lambda_t^2)} + \frac{1}{4} \cdot \frac{(-2 \cdot \lambda_{0t} \cdot \Delta\lambda_r^2 - 2 \cdot \lambda_{0r} \cdot \Delta\lambda_t^2)^2}{[\Delta\lambda_t^2 \cdot [\Delta\lambda_t^2 \cdot (\Delta\lambda_t^2 + \Delta\lambda_r^2)]]}\right]}{\sqrt{\Delta\lambda_t^2 + \Delta\lambda_r^2}}\right] \qquad (2\text{-}7)$$

The minimum of the transmitted power obviously is obtained when the grating wavelengths match, i.e. $\lambda_{Ot} = \lambda_{Or}$. For this condition the transmitted power becomes:

$$P_{tg} = P_r \cdot \left(1 - t \cdot \frac{\Delta\lambda_t}{\sqrt{\Delta\lambda_t^2 + \Delta\lambda_r^2}}\right), \qquad (2\text{-}8)$$

i.e. full blockage only is possible when the bandwidth of the reflecting grating is small compared to the demodulation (transmission) grating.

For operating the system as a demodulator, the variation of the measured optical $P_t$ with respect to the wavelength shift defines the sensitivity of the system. It is therefore necessary to calculate the derivative of the power function with respect to the wavelength of the sensor grating. When the output power is normalized with the input power, the following is obtained:

$$\frac{d\left(\frac{P_{tg}}{P_r}\right)}{d\Delta\lambda_{0r}} = 2 \cdot t \cdot \Delta\lambda_t \cdot (\lambda_{0t} - \lambda_{0r}) \cdot (\Delta\lambda_t^2 + \Delta\lambda_r^2)^{-\frac{3}{2}} \cdot \exp\left[\frac{-(\lambda_{0r} - \lambda_{0t})^2}{\Delta\lambda_t^2 + \Delta\lambda_r^2}\right] \quad (2\text{-}9)$$

This function, describing the sensor sensitivity, has two extrema. They can be found by finding the zero values of its derivative, which yield the following two solutions:

$$(\lambda_{0r} - \lambda_{0t})_{opt} = \begin{bmatrix} \frac{-1}{\sqrt{2}} \cdot \sqrt{\Delta\lambda_t^2 + \Delta\lambda_r^2} \\ \frac{1}{\sqrt{2}} \cdot \sqrt{\Delta\lambda_t^2 + \Delta\lambda_r^2} \end{bmatrix} \quad (2\text{-}10)$$

At this optimal difference between the central wavelengths of the reflecting and the transmitting grating the system operates at maximum sensitivity. If this condition is entered into equation (2-9), it becomes:

$$\left[\frac{d\left(\frac{P_{tg}}{P_r}\right)}{d\Delta\lambda_{0r}}\right]_{opt} = -t \cdot \Delta\lambda_t \cdot \frac{\sqrt{2}}{(\Delta\lambda_t^2 + \Delta\lambda_r^2)} \cdot \exp\left[\frac{\left(\frac{-1}{2} \cdot \Delta\lambda_t^2 - \frac{1}{2} \cdot \Delta\lambda_r^2\right)}{(\Delta\lambda_t^2 + \Delta\lambda_r^2)}\right] \quad (2\text{-}11)$$

To investigate the influence of the other system parameters on sensitivity, the variation of the sensitivity with respect to the bandwidth of the transmission grating is tested by calculating the derivative with respect to this parameter and setting the result to zero; the result of this calculation $$\Delta\lambda_t = \begin{pmatrix} -\Delta\lambda_r \\ \Delta\lambda_r \end{pmatrix}, \quad (2\text{-}12)$$

i.e., the optimum spectral width of the readout grating is the one equal to the sensor grating. The sensitivity value then becomes:

$$\left[\frac{d\left(\frac{P_{tg}}{P_r}\right)}{d\Delta\lambda_{0r}}\right]_{opt} = \frac{-\exp\left(\frac{-1}{2}\right)}{\sqrt{2}} \cdot \frac{t}{\Delta\lambda_t} \quad (2\text{-}13)$$

Equation 2-13 shows that in the case of gratings of equal bandwidth operated at the optimal wavelength difference, the sensitivity can only be increased by choosing very narrow grating bandwidth $\Delta\lambda$ and by maximizing the reflectivity of the readout grating. The grating bandwidth is the more effective parameter to optimize, since the maximum value for the transmission coefficient is one. Therefore, asymptotically approaching this limit is not very effective; the difference in sensitivity between a grating with 20 dB reflectivity (t=0.99) and a 30 dB grating (t=0.999) is only 1%.

The sensitivity of matched demodulation has to be compared with the sensitivity of demodulation using a linear dispersive filter, which has the advantage of a larger operating bandwidth. Assuming a filter with linear transmission variation from tf1 to tf2 within a wavelength interval $\lambda_1$ to $\lambda_2$, the transmission can be written as:

$$T_f = \Phi(\lambda - \lambda_1) \cdot (1 - \Phi(\lambda - \lambda_2)) \cdot \left[t_{f1} + \frac{(t_{f2} - t_{f1}) \cdot (\lambda - \lambda_1)}{\lambda_2 \lambda_1}\right], \quad (2\text{-}14)$$

Where $\Phi$ denotes the Heaviside Step Function, which is used to set the value of $T_f$ to zero outside the transmission interval $\lambda_1$ to $\lambda_2$. If the bandwidth of the reflection grating is small compared to the bandwidth of the demodulation filter (a condition required for a reasonable operating range), the transmitted power becomes:

$$\frac{P_{tf}}{P_r} = t_{f1} \cdot \frac{(t_{f2} - t_{f1}) \cdot (\lambda_{0r} - \lambda_1)}{\lambda_2 - \lambda_1} \quad (2\text{-}15)$$

The sensitivity of this arrangement again is given by the derivative of this term, which is:

$$\frac{d\left(\frac{P_{tg}}{P_r}\right)}{d\lambda_{0r}} = \frac{(t_{f2} - t_{f1})}{(\lambda_2 - \lambda_1)} \quad (2\text{-}16)$$

Exemplary Calculations Based on Theoretical Model

Figure 4:
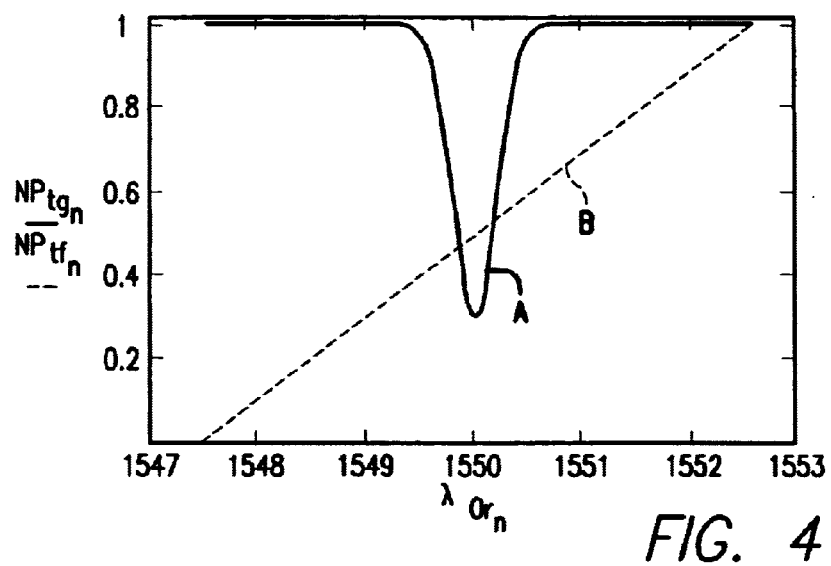
FIG. 4 shows a normalized output power curve.

FIG. 4 shows an example of the normalized power output $NP_{tg}$ (solid line) of a system formed by two gratings with 2 nm bandwidth and 99% reflectivity, varying the wavelength of the sensor grating with respect to the demodulation grating at 1550 nm. Equation 2-8 yields a minimum transmission of $1-t*2^{-\frac{1}{2}}$ for gratings of equal (and arbitrary) bandwidth; this amount to about 30% minimum transmission for this configuration. For comparison, the normalized output power $NP_{tf}$ from a linear dispersive filter with transmission variation from 1% to 99% within 5 nm (B, dashed line) is depicted.

Figure 5:
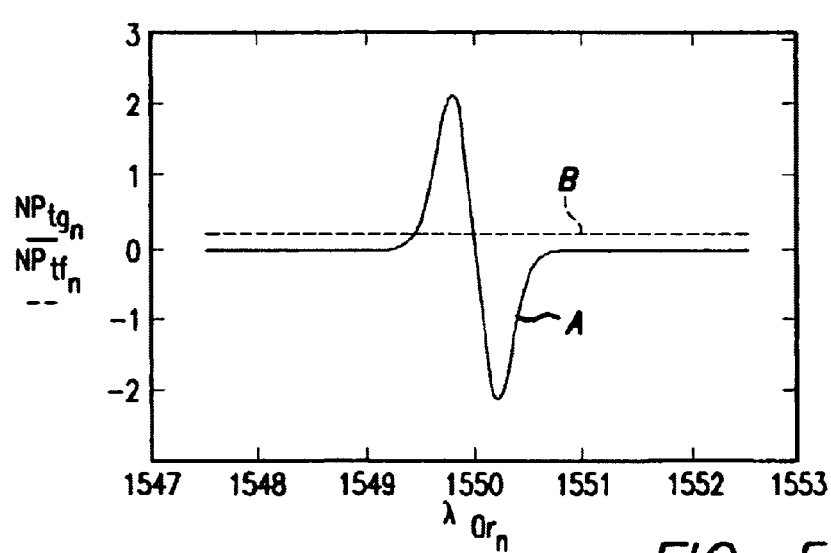
FIG. 5 shows a sensitivity curve

The sensitivity of the demodulation can be evaluated by calculating the derivatives of the normalized power functions according to Equation 2-9 and 2-16. FIG. 5 shows the results of the calculation for the given parameters.

The peak sensitivity of the matched grating demodulation system is $2.12/\text{nm}^{-1}$; for 0.1 nm wide gratings, the peak sensitivity doubles to $4.24/\text{nm}^{-1}$. In comparison, the sensitivity of the linear filter is $02/\text{nm}^{-1}$ over the entire range. This tradeoff between the high sensitivity of a matched grating demodulator and the high bandwidth of a linear filter led to our design for an active tracking system, which actively keeps the demodulation grating in the position of maximum sensitivity, as given by Equation 2-10.

Although particular embodiments of the invention have been described and illustrated herein, it is recognized that modifications and variations may readily occur to those skilled in the art, and consequently it is intended that the claims be interpreted to cover such modifications and equivalents.

What is claimed is:

1. A method for determining the wavelength change of a signal (the subject signal) in a guided wave optical transmission element comprising;

passing the subject signal through a tunable FBG;
    converting the optical signal exiting the tunable FBG to a first electrical signal Vsignal which has a known relationship to the wavelength of the optical signal exiting the tunable FBG;
    establishing a selected set electrical value, Vset, which
        has relationship to a selected wavelength representing a high sensitivity portion of the intensity curve for the tunable FBG; and tuning the wavelength of the tunable FBG such that Vsignal is changed such that the difference value of Vsignal and Vset is minimized.

2. The method of claim 1 in which the tuning of the tunable FBG .is accomplished by a physical effect on it which changes its central wavelength.

3. The method of claim 1 in which the tunable FBG is tuned such that the difference between V set and V signal is essentially zero.

4. The method of claim 1 in which V signal is passed through a low pass filter to establish that an upper limit of rate of change of wavelength of the subject signal will be processed by the method.

5. A method of demodulation of an incoming received optical signal for maintaining the signal in a high sensitivity intensity region comprising;

passing the received optical signal through a tunable Fiber Bragg Grating; converting the optical signal from the tunable Fiber Bragg Grating to an electrical signal voltage, V signal, which is a function of the central wavelength of the optical signal;

in a closed loop, comparing V signal to a predetermined voltage, V set, which is a function of the time dependent central wavelength of the low frequency spectrum of the received optical signal, to provide a signal representing the instantaneous difference;

between V signal and V set, defined as V control and adjusting the tunable Fiber Bragg Grating to provide a subsequent V signal which approaches or is equal to V set;

in the closed loop continuously adjusting the tunable Fiber Bragg Grating in accordance with any difference between V signal and V set;

whereby the center wavelength of the tunable Fiber Bragg Grating tracks the center wavelength of the incoming optical signal.

6. Apparatus for actively tracking the change in the central wavelength of an incoming optical signal having changes in its central wavelength comprising a tunable FBG for receiving the incoming optical signal and for outputting a signal having a central wavelength which is characteristic of the tunable FBG;

a converter for converting the optical signal output of the tunable FBG to a voltage (Vsignal) which has a known relationship to the intensity of the output optical signal of the tunable FBG;

a processor having a voltage input which is selected (V set) to represent a central wavelength in the high sensitivity portion of the intensity curve for the incoming optical signal of the processor and performing a subtraction of Vset and V signal and having a voltage output which is the difference (V control);

a tuning controller connected to the tunable FBG to change its characteristic central wavelength and which changes the characteristic central wavelength of the tunable FBG by a change in a physical parameter so as to reduce the difference between Vsignal and Vset.

7. Apparatus comprising a first optical waveguide including a tunable FBG for transmitting an optical signal having a characteristic center wavelength, and apparatus including a feedback loop, said feedback loops including first means responsive to an input transmitted optical signal for generating an electrical signal representative of the difference between the instantaneous intensity of said optical signal and the maximum intensity of said optical signal, said apparatus also including second means responsive to said difference signal for adjusting said tunable FBG to reflect light about a center wavelength which corresponds to said maximum intensity.

8. Apparatus comprising an optical signal source and a waveguide, said optical signal source being coupled to said waveguide, said waveguide including a tunable fiber Bragg grating (tFBG), said tFBG being coupled to a feedback loop, said feedback loop including means responsive to the instantaneous light intensity output signal from said tFBG to generate a voltage signal representative of the instantaneous light intensity output signal, the processor including means for storing a pre-set voltage corresponding to the maximum light intensity signal output from said grating when the center wavelength of the range of wavelengths which the grating transmits corresponds to the center wavelength of the optical signal, and means for tuning said grating to change the center wavelength thereof to a wavelength which matches the center wavelength of said optical signal source responsive to the difference between the preset voltage and the voltage signal representative of the instantaneous light signal intensity.

9. Optical apparatus comprising a first optical waveguide including a tunable FBG having a characteristic center wavelength, said apparatus including a closed loop responsive to the instantaneous intensity of an optical signal transmitted by said tunable FBG for comparing an electrical signal representative of that intensity (V signal) to a reference signal representing the maximum realizable intensity achieved when the center wavelength of an input optical signal corresponds to the center wavelength of said tunable FBG (V set) and a tuning device to vary a physical parameter of the tunable FBG toward causing V signal to be equal to V set further comprising a sensor which provides an optical signal and an optical fiber which carries the signal from the sensor to tunable FBG.

10. Optical apparatus as in claim 9 further comprising a sensor for providing a subject optical signal and an optical fiber connected between said sensor and a said tunable FBG to transmit the subject optical signal to the tunable FBG.

11. Optical apparatus as in claim 9 wherein said closed loop includes a lowpass filter and subtraction device.

12. Optical apparatus as in claim 10 wherein said sensor is at least one FBG.

13. Optical apparatus as in claim 10 wherein said sensor is a plurality of sensors, and further comprising a wavelength division multiplexer for distinguishing the signal from each of said sensors.

14. Optical apparatus as in claim 13 wherein said plurality of sensors comprise a plurality of FBGs.

* * * * *